US012633467B2

(12) United States Patent
Seo et al.

(10) Patent No.: US 12,633,467 B2
(45) Date of Patent: May 19, 2026

(54) MULTILAYER ELECTRONIC COMPONENT

(71) Applicant: SAMSUNG ELECTRO-MECHANICS CO., LTD., Suwon-si (KR)

(72) Inventors: Chang Ho Seo, Suwon-si (KR); Jong Ho Lee, Suwon-si (KR); Yong Min Hong, Suwon-si (KR); Jung Tae Park, Suwon-si (KR); Min Woo Kim, Suwon-si (KR); Yong Park, Suwon-si (KR); Sun Mi Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 145 days.

(21) Appl. No.: 18/588,885

(22) Filed: Feb. 27, 2024

(65) Prior Publication Data

US 2024/0387114 A1    Nov. 21, 2024

(30) Foreign Application Priority Data

May 17, 2023    (KR) ........................ 10-2023-0063829
Oct. 26, 2023    (KR) ........................ 10-2023-0144805

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |
| *H01G 4/224* | (2006.01) |

(52) U.S. Cl.
CPC .............. *H01G 4/30* (2013.01); *H01G 4/008* (2013.01); *H01G 4/012* (2013.01); *H01G 4/12* (2013.01); *H01G 4/224* (2013.01)

(58) Field of Classification Search
None
See application file for complete search history.

(56) References Cited

U.S. PATENT DOCUMENTS

| | | | |
|---|---|---|---|
| 2016/0351335 A1* | 12/2016 | Kato ...................... | H01G 4/232 |
| 2017/0076864 A1* | 3/2017 | Okai ...................... | H01G 4/224 |

(Continued)

FOREIGN PATENT DOCUMENTS

| | | |
|---|---|---|
| KR | 10-2021-0081668 A | 7/2021 |
| KR | 10-2022-0056457 A | 5/2022 |

*Primary Examiner* — Timothy J. Dole
*Assistant Examiner* — Esther N Lian
(74) *Attorney, Agent, or Firm* — MORGAN. LEWIS & BOCKIUS LLP

(57) ABSTRACT

A multilayer electronic component includes a body including a dielectric layer and an internal electrode alternately disposed with the dielectric layer in a first direction, and including a first surface and a second surface opposing each other in the first direction, a third surface and a fourth surface, connected to the first and second surfaces and opposing each other in a second direction, and a fifth surface and a sixth surface, connected to the first to fourth surfaces and opposing each other in a third direction; external electrodes disposed on the third and fourth surfaces; and a first side margin portion and a second side margin portion, respectively disposed on the fifth and sixth surfaces, wherein the first and second side margin portions include a first extension portion disposed to extend onto a portion of the first surface and a portion of the second surface.

18 Claims, 17 Drawing Sheets

(56) References Cited

U.S. PATENT DOCUMENTS

| | | | |
|---|---|---|---|
| 2017/0076865 A1* | 3/2017 | Tanaka | H01G 4/232 |
| 2018/0233286 A1* | 8/2018 | Yu | H01G 4/236 |
| 2019/0180935 A1* | 6/2019 | Kato | H01G 4/14 |
| 2020/0098519 A1* | 3/2020 | Kusumoto | H01G 4/232 |
| 2021/0074479 A1* | 3/2021 | Lee | H01G 4/1227 |
| 2021/0193389 A1 | 6/2021 | Kim et al. | |
| 2021/0225594 A1* | 7/2021 | Hashimoto | H01G 4/30 |
| 2022/0130612 A1* | 4/2022 | Lee | H01G 4/012 |
| 2023/0139075 A1* | 5/2023 | Lee | H01G 4/232 |
| | | | 361/53 |

* cited by examiner

FIRST DIRECTION

SECOND DIRECTION

I-I'

M

MULTILAYER ELECTRONIC COMPONENT

CROSS-REFERENCE TO RELATED APPLICATION(S)

This application claims benefit of priority to Korean Patent Application No. 10-2023-0063829 filed on May 17, 2023 and Korean Patent Application No. 10-2023-0144805 filed on Oct. 26, 2023 in the Korean Intellectual Property Office, the disclosures of which are incorporated herein by reference in their entireties.

TECHNICAL FIELD

The present disclosure relates to a multilayer electronic component.

A multilayer ceramic capacitor (MLCC), a multilayer electronic component, may be a chip condenser mounted on the printed circuit boards of various types of electronic products such as image display devices including a liquid crystal display (LCD), a plasma display panel (PDP), or the like, a computer, a smartphone, a mobile phone, or the like, serving to charge or discharge electricity therein or therefrom.

Such a multilayer ceramic capacitor may be used as a component of various electronic devices, as the multilayer ceramic capacitor has a small size with high capacitance and is easily mounted. As various electronic devices such as computers, mobile devices, or the like have been miniaturized and implemented with high-output, demand for miniaturization and high capacitance of the multilayer ceramic capacitors has increased.

In order to implement a multilayer ceramic capacitor with a small size and high capacitance, maximization of an effective area (an increase in an effective volume fraction necessary for realizing capacitance) of an electrode is required. In order to implement a multilayer ceramic capacitor having a small size with high capacitance, as described above, in manufacturing the multilayer ceramic capacitor, an internal electrode may be exposed in a width direction of a body to maximize an area in a width direction of the internal electrode by a margin-free design, but, after manufacturing the body and before a sintering operation, a method in which a ceramic green sheet for a side margin portion is separately attached to a surface of the electrode exposed in the width direction of the body, may be applied.

As the side margin portion is formed by the method in which a ceramic green sheet for a side margin portion is separately attached, capacitance per unit volume of the capacitor may be improved, but there may be risks that penetration of external moisture or penetration of a plating solution during a plating process through an interface joint portion between the body and the side margin portion causes various problems such as shortening of a lifespan of a chip, occurrence of defects, or the like.

In addition, pores created at an interface between the body and the side margin portion may cause concentration of an electrical field, which may cause a problem of decreasing a breakdown voltage (BDV), a decrease in sintering density due to the pores may cause a decrease in moisture resistance reliability, and as an interfacial joint portion occurs on a boundary between the body and the side margin portion, a decrease in bonding strength and accordingly, a decrease in moisture resistance reliability, may occur.

Accordingly, in an ultra-small and high-capacitance product, research into preventing a decrease in breakdown voltage (BDV) and a decrease in moisture resistance reliability is being actively conducted.

SUMMARY

An aspect of the present disclosure is to provide a multilayer electronic component having improved moisture resistance reliability by complementing an interface structure of a body and a side margin portion to prevent permeation of external moisture.

An aspect of the present disclosure is to provide a multilayer electronic component having improved breakdown voltage and moisture resistance reliability by reducing the number of pores therein.

However, various problems to be solved by the present disclosure are not limited to the above-described contents, and can be more easily understood in a process of explaining specific embodiments of the present disclosure.

According to an aspect of the present disclosure, a multilayer electronic component includes a body including a dielectric layer and an internal electrode alternately disposed with the dielectric layer in a first direction, and including a first surface and a second surface opposing each other in the first direction, a third surface and a fourth surface opposing each other in a second direction and connected to the first and second surfaces, and a fifth surface and a sixth surface opposing each other in a third direction and connected to the first to fourth surfaces; an external electrode disposed on the third and fourth surfaces; and a first side margin portion and a second side margin portion disposed on the fifth and sixth surfaces, respectively, wherein the first and second side margin portions each includes a first extension portion disposed to extend onto a portion of the first surface and a portion of the second surface.

According to an aspect of the present disclosure, a multilayer electronic component includes a body including a dielectric layer and an internal electrode alternately disposed with the dielectric layer in a first direction, and including a first surface and a second surface opposing each other in the first direction, a third surface and a fourth surface opposing each other in a second direction and connected to the first and second surfaces, and a fifth surface and a sixth surface opposing each other in a third direction and, connected to the first to fourth surfaces; an external electrode disposed on the third and fourth surfaces; and a first side margin portion and a second side margin portion disposed on the fifth and sixth surfaces, respectively, wherein the first and second side margin portions each includes a first extension portion disposed to extend onto a portion of the first surface and a portion of the second surface, and a second extension portion disposed to extend onto a portion of the third surface and a portion of the fourth surface, wherein the first extension portion of the first side margin portion includes a 1-1 extension portion disposed to extend onto a portion of the first surface, and a 1-2 extension portion disposed to extend onto a portion of the second surface, the first extension portion of the second side margin portion includes a 1-1 extension portion disposed to extend onto a portion of the first surface, and a 1-2 extension portion disposed to extend onto a portion of the second surface, and an average size along the third direction for each of the 1-1 extension portion of the first side margin portion contacting the first surface, the 1-2 extension portion of the first side margin portion contacting the second surface, the 1-1 extension portion of the second side margin portion contacting the first surface, and the 1-2 extension portion of the second side margin portion contacting the second surface is greater than 0% and less than 50% of an average size of the body along the third direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
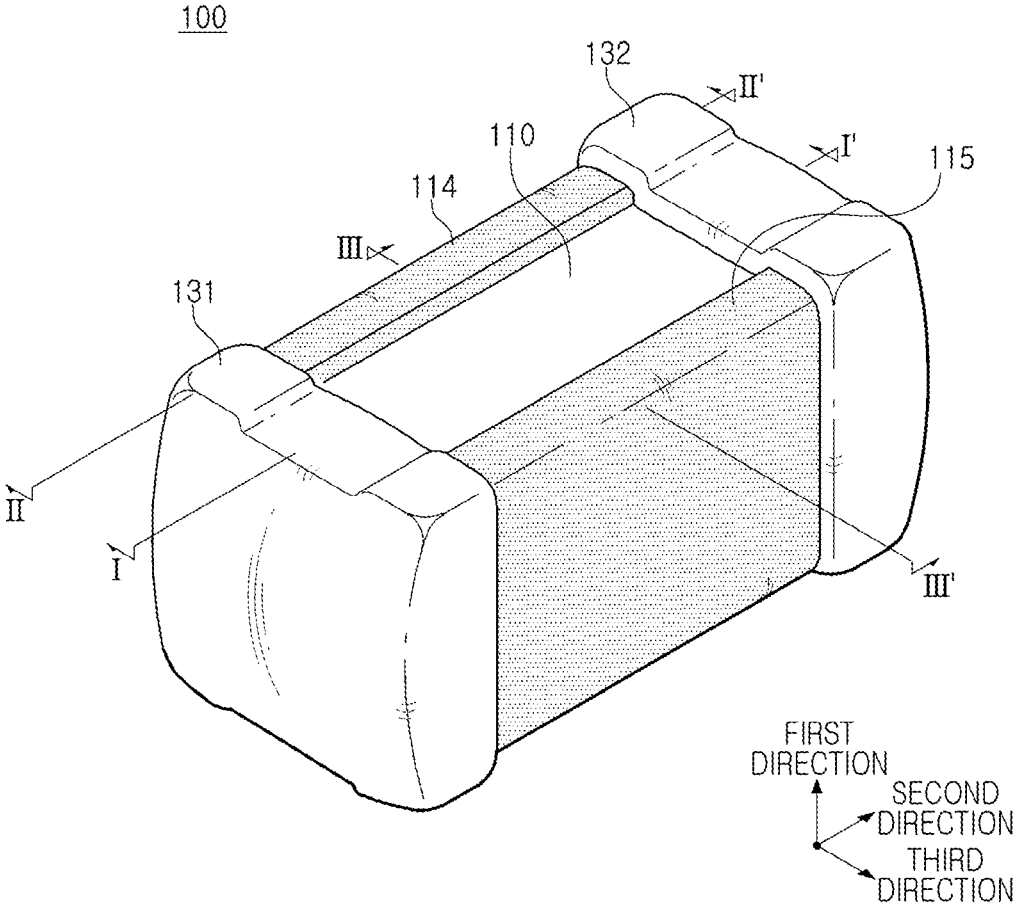
FIG. 1 schematically illustrates a perspective view of a multilayer electronic component according to an embodiment of the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes, sizes, and the like, of the elements in the drawings may be exaggerated for clarity of description, and the elements denoted by the same reference numerals in the drawings may be the same elements.

In addition, in order to clearly explain the present disclosure, portions in the drawings not related to the description will be omitted for clarification of the present disclosure, and a thickness may be enlarged to clearly illustrate layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawing, a first direction may be defined as a stack direction or a thickness T direction, a second direction may be defined as a length L direction, and a third direction may be defined as a width W direction.

Multilayer Electronic Component

FIG. 1 schematically illustrates a perspective view of a multilayer electronic component according to an embodiment of the present disclosure.

Figure 2:
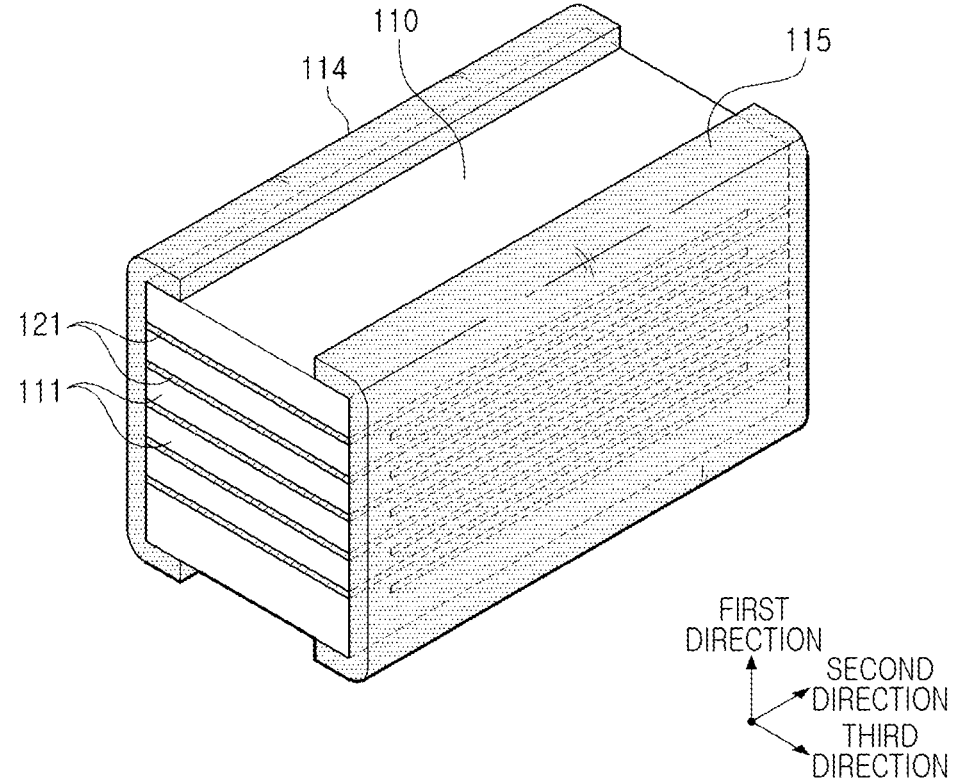
FIG. 2 schematically illustrates a perspective view of the multilayer electronic component of FIG. 1 excluding an external electrode.

FIG. 2 schematically illustrates a perspective view of the multilayer electronic component of FIG. 1 excluding an external electrode.

Figure 3:
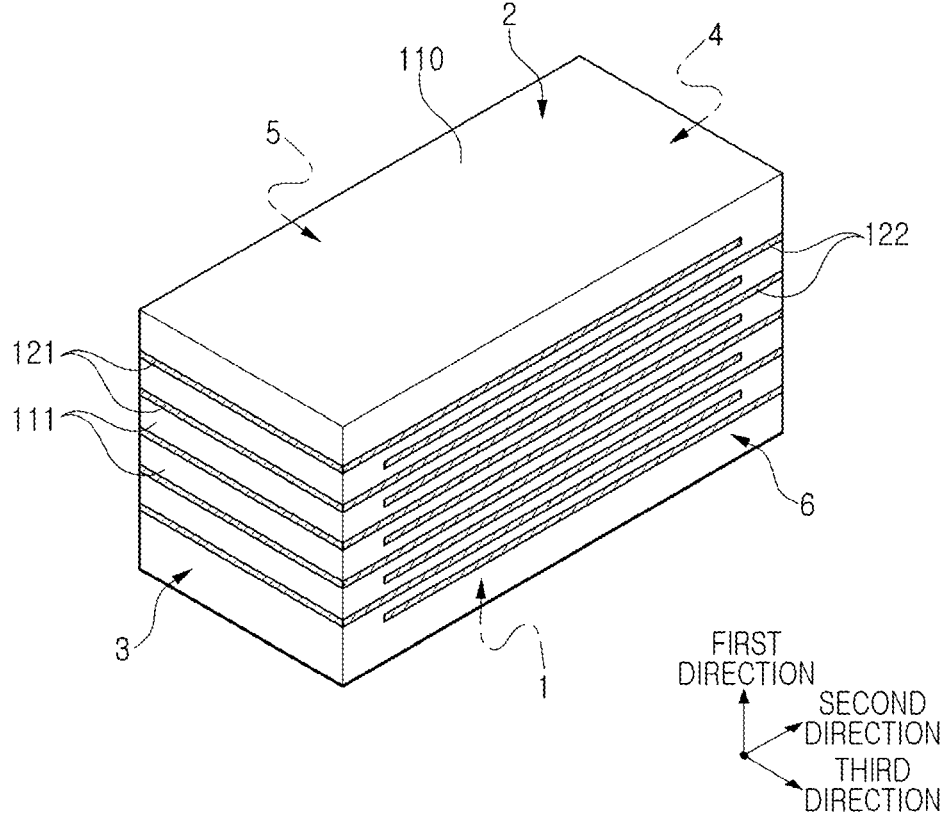
FIG. 3 schematically illustrates a perspective view of the multilayer electronic component of FIG. 1 excluding an external electrode and a side margin portion.

FIG. 3 schematically illustrates a perspective view of the multilayer electronic component of FIG. 1 excluding an external electrode and a side margin portion.

Figure 4:
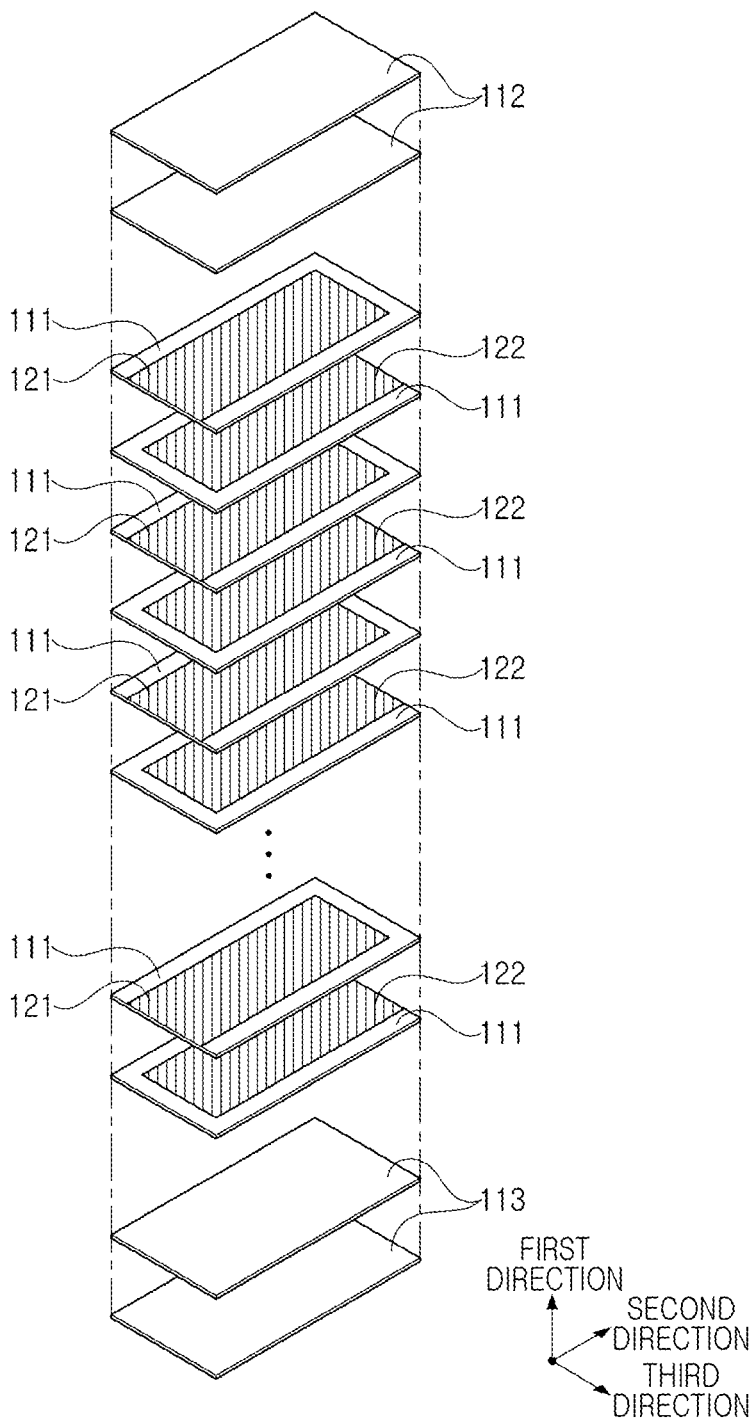
FIG. 4 schematically illustrates an exploded perspective view illustrating the stacking of internal electrodes.

FIG. 4 schematically illustrates an exploded perspective view illustrating the stacking of internal electrodes.

Figure 5:
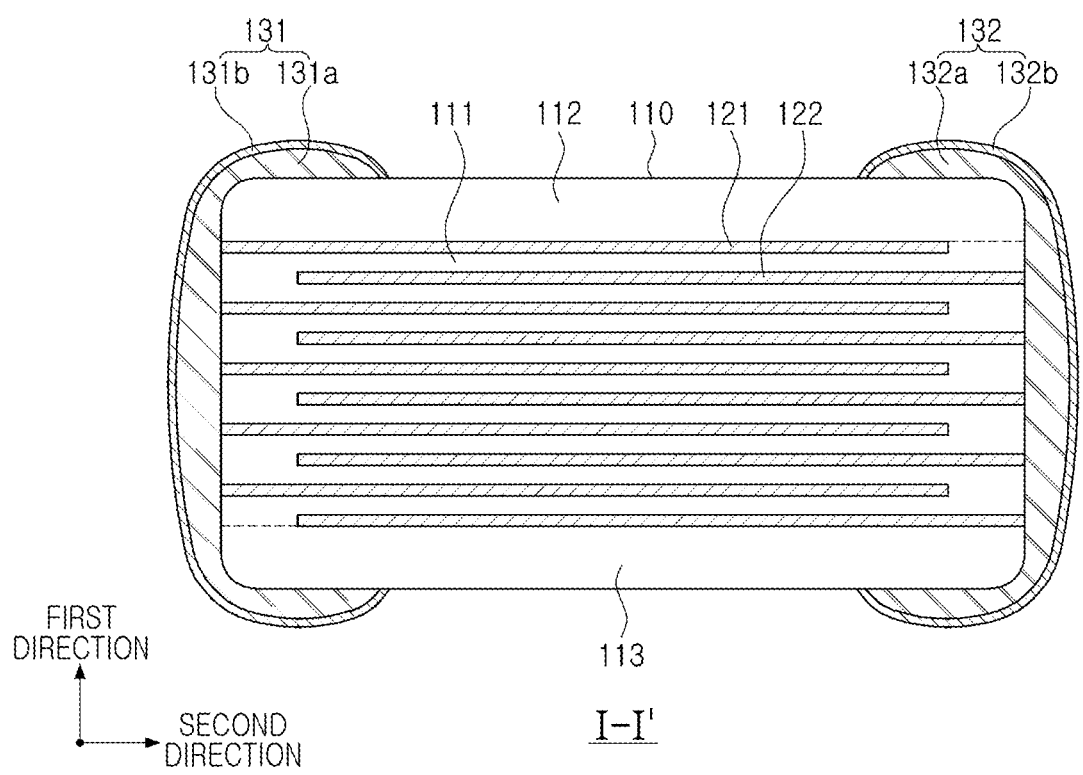
FIG. 5 schematically illustrates a cross-sectional view of FIG. 1, taken along line I-I'.

FIG. 5 schematically illustrates a cross-sectional view of FIG. 1, taken along line I-I'.

Figure 6:
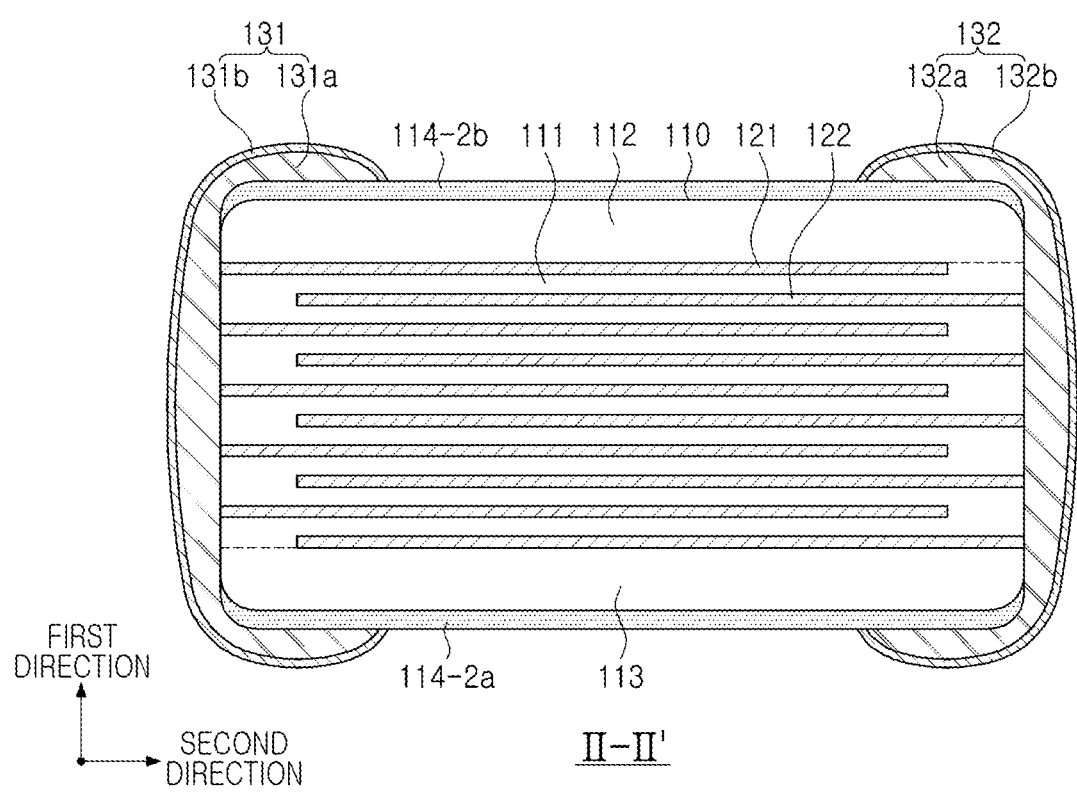
FIG. 6 schematically illustrates a cross-sectional view of FIG. 1, taken along line II-II'.

FIG. 6 schematically illustrates a cross-sectional view of FIG. 1, taken along line II-II'.

Figure 7:
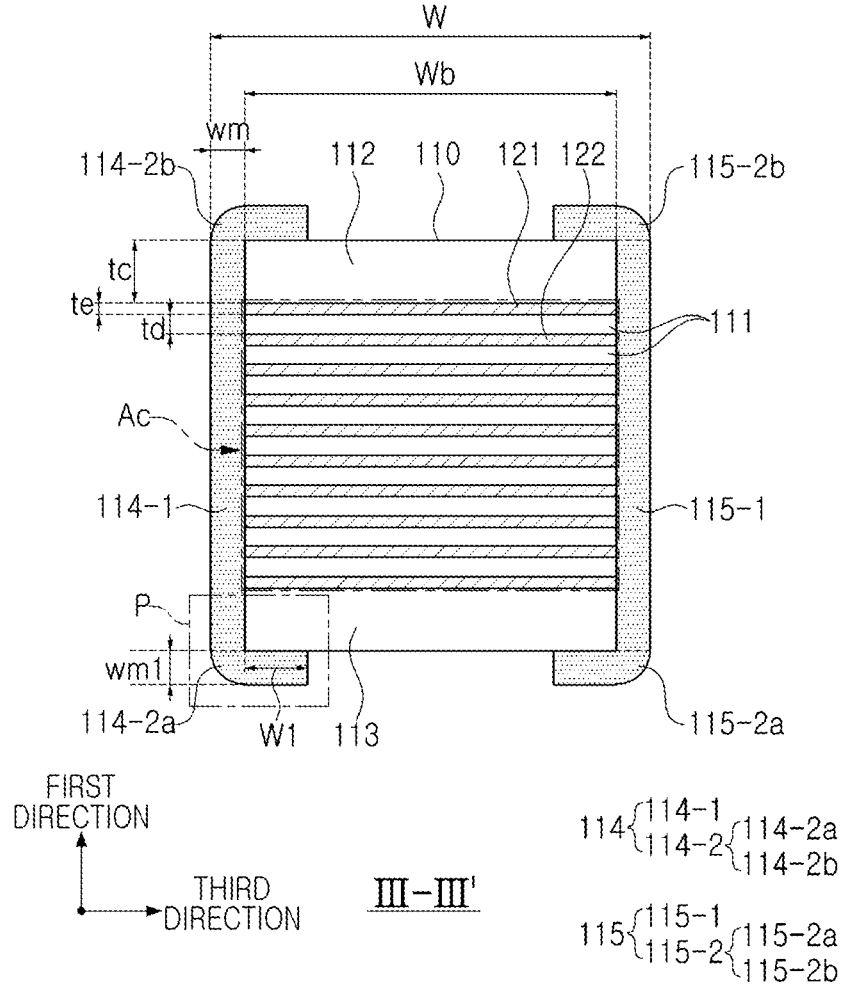
FIG. 7 schematically illustrates a cross-sectional view of FIG. 1, taken along line III-III'.

FIG. 7 schematically illustrates a cross-sectional view of FIG. 1, taken along line III-III'.

Figure 8A:
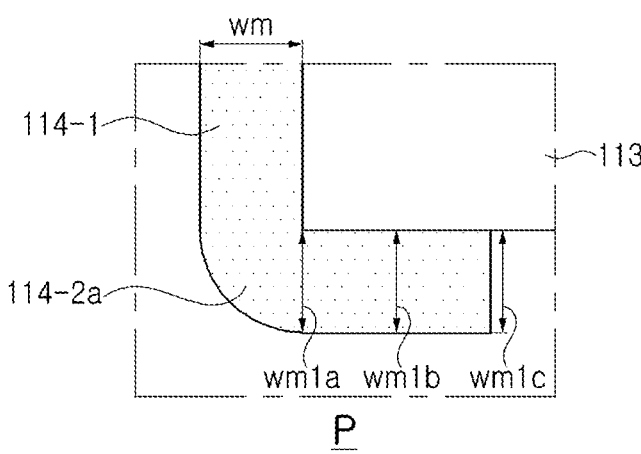
FIGS. 8A to 8C schematically illustrate various enlarged views of portion P of FIG. 7.
Figure 8B:
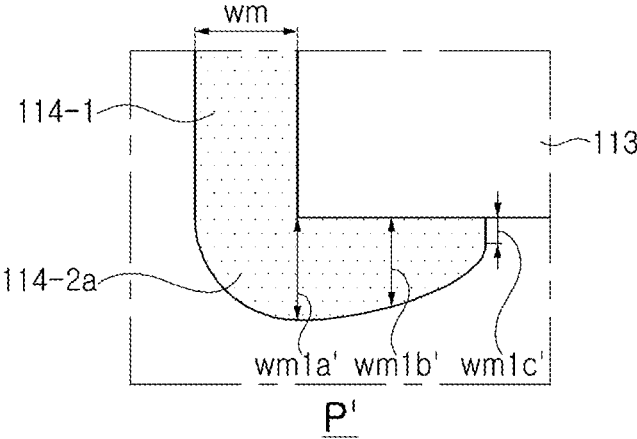
Figure 8C:
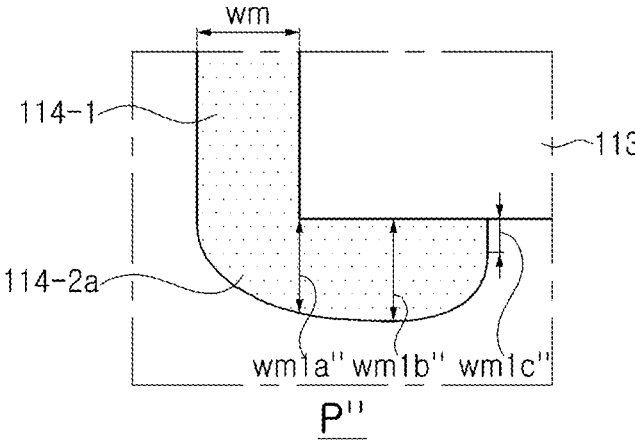

FIGS. 8A to 8C schematically illustrate various enlarged views of portion P of FIG. 7.

Figure 9A:
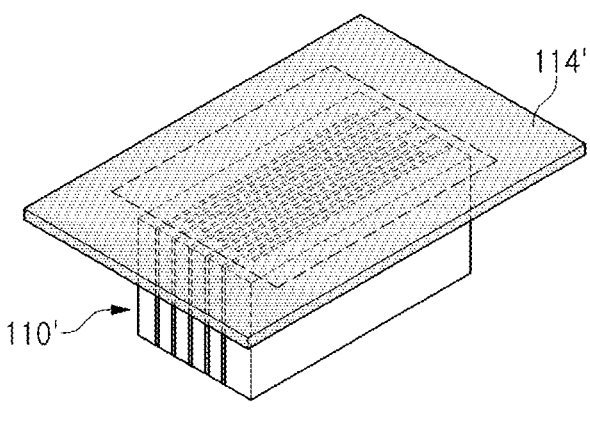
FIGS. 9A to 9C schematically illustrate a process of manufacturing the side margin portion of FIG. 2.
Figure 9B:
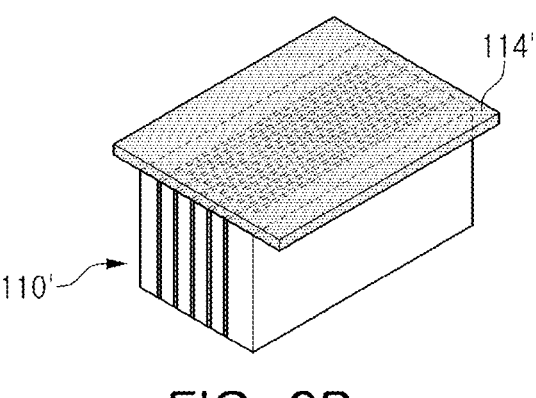
Figure 9C:
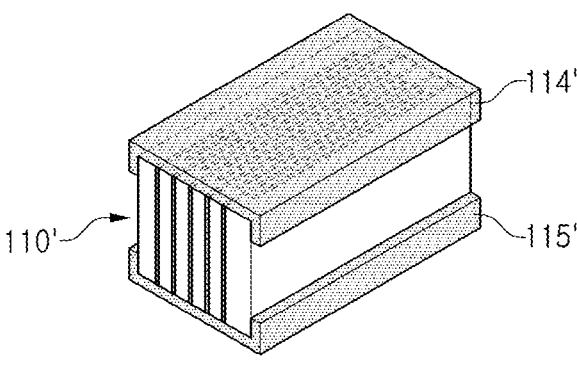

FIGS. 9A to 9C schematically illustrate a process of manufacturing the side margin portion of FIG. 2.

Figure 10:
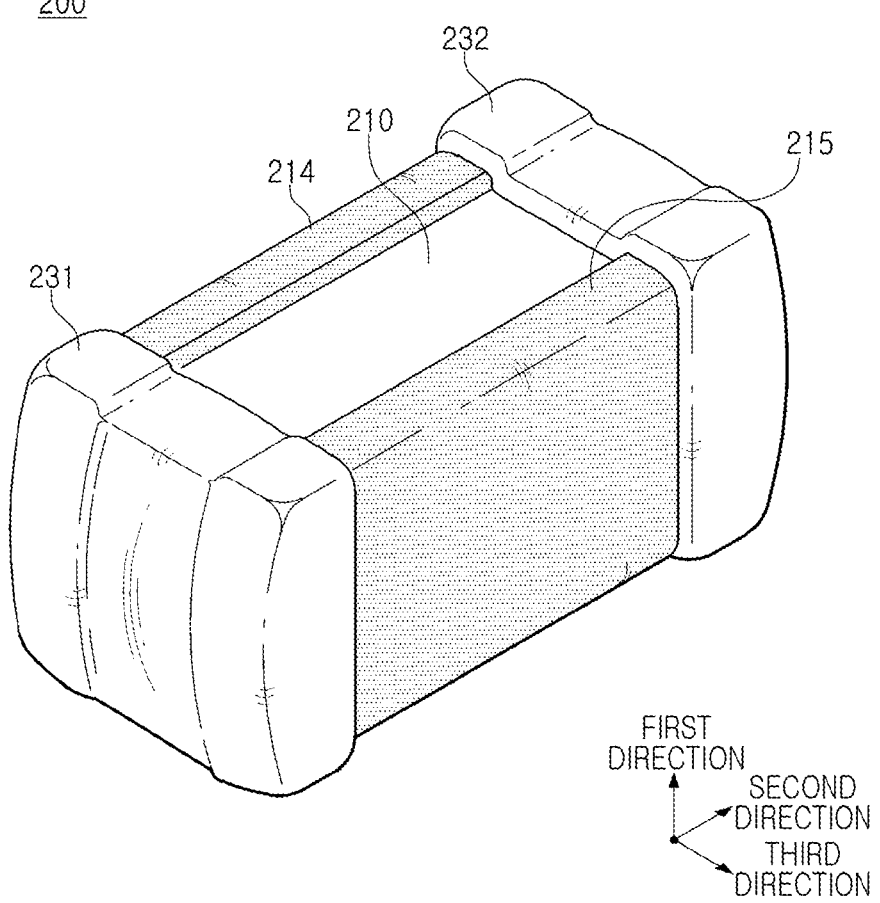
FIG. 10 schematically illustrates a perspective view of a multilayer electronic component according to another embodiment of the present disclosure.

FIG. 10 schematically illustrates a perspective view of a multilayer electronic component according to another embodiment of the present disclosure.

Figure 11:
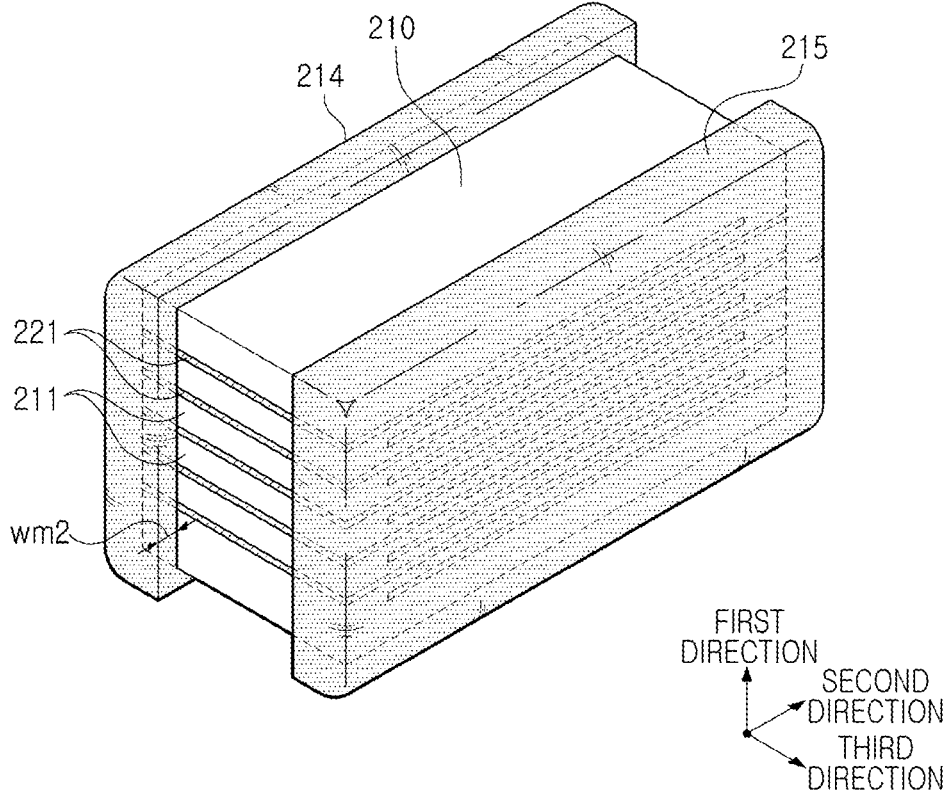
FIG. 11 schematically illustrates a perspective view of the multilayer electronic component of FIG. 10 excluding an external electrode.

FIG. 11 schematically illustrates a perspective view of the multilayer electronic component of FIG. 10 excluding an external electrode.

Figure 12:
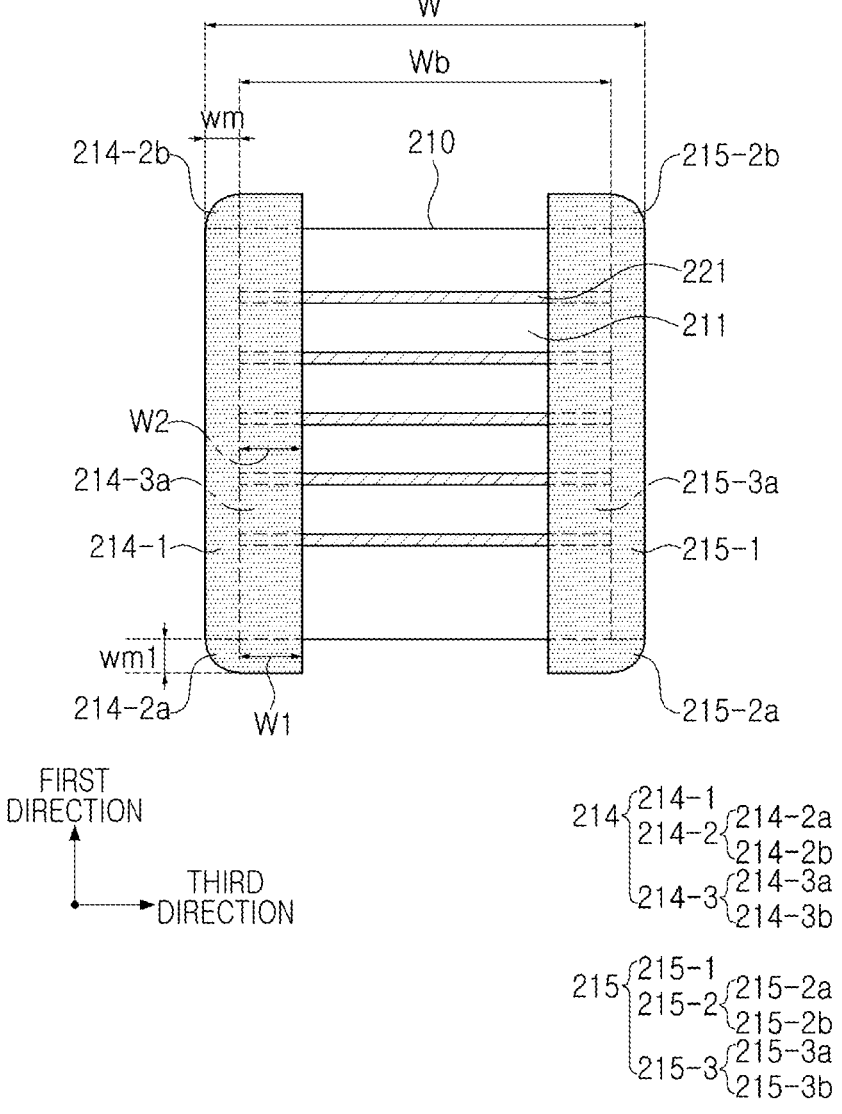
FIG. 12 schematically illustrates a side view of the body and the side margin portion of FIG. 11, when viewed in a second direction.

FIG. 12 schematically illustrates a side view of the body and the side margin portion of FIG. 11, when viewed in a second direction.

Figure 13A:
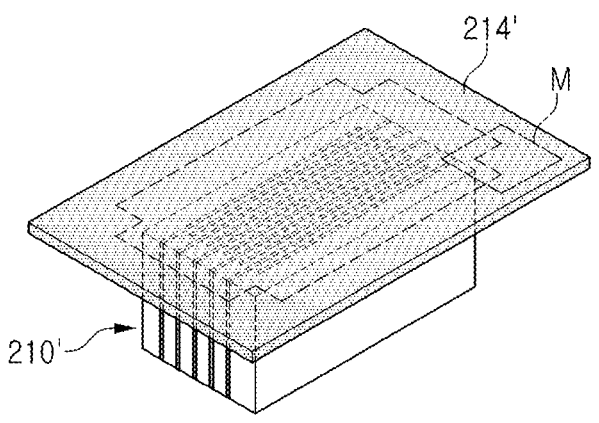
FIGS. 13A to 13C schematically illustrate a process of manufacturing the side margin portion of FIG. 11.
Figure 13B:
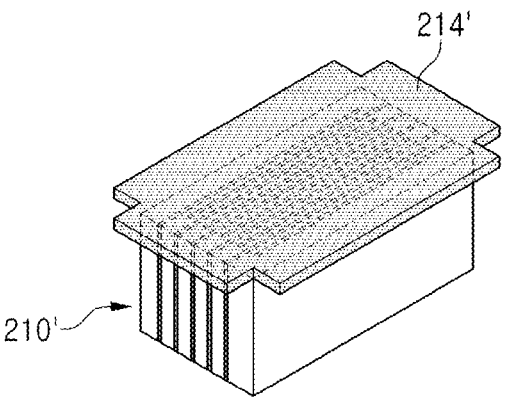
Figure 13C:
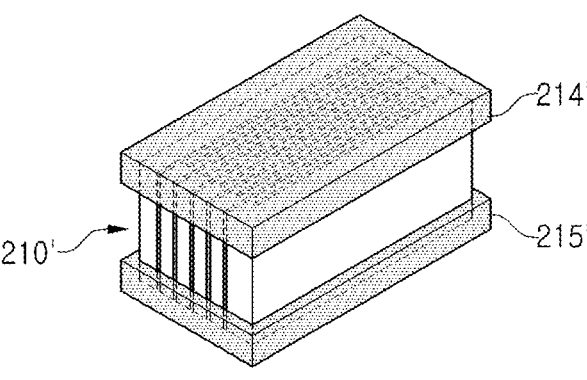

FIGS. 13A to 13C schematically illustrates a process of manufacturing the side margin portion of FIG. 11.

Figure 14:
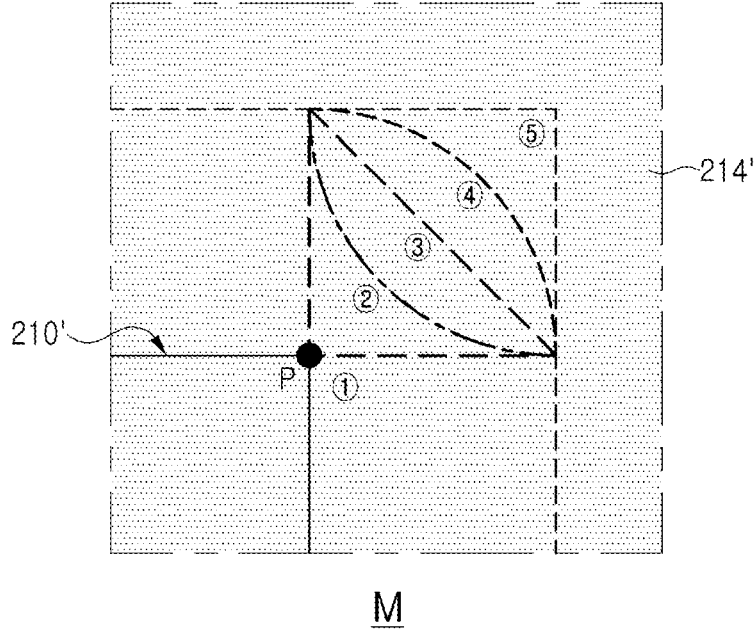
FIG. 14 schematically illustrates an enlarged view of portion M of FIG. 13A, and schematically illustrates methods for forming various shapes of the side margin portion.

FIG. 14 schematically illustrates an enlarged view of portion M of FIG. 13A, and schematically illustrates methods for forming various shapes of the side margin portion.

Figure 15:
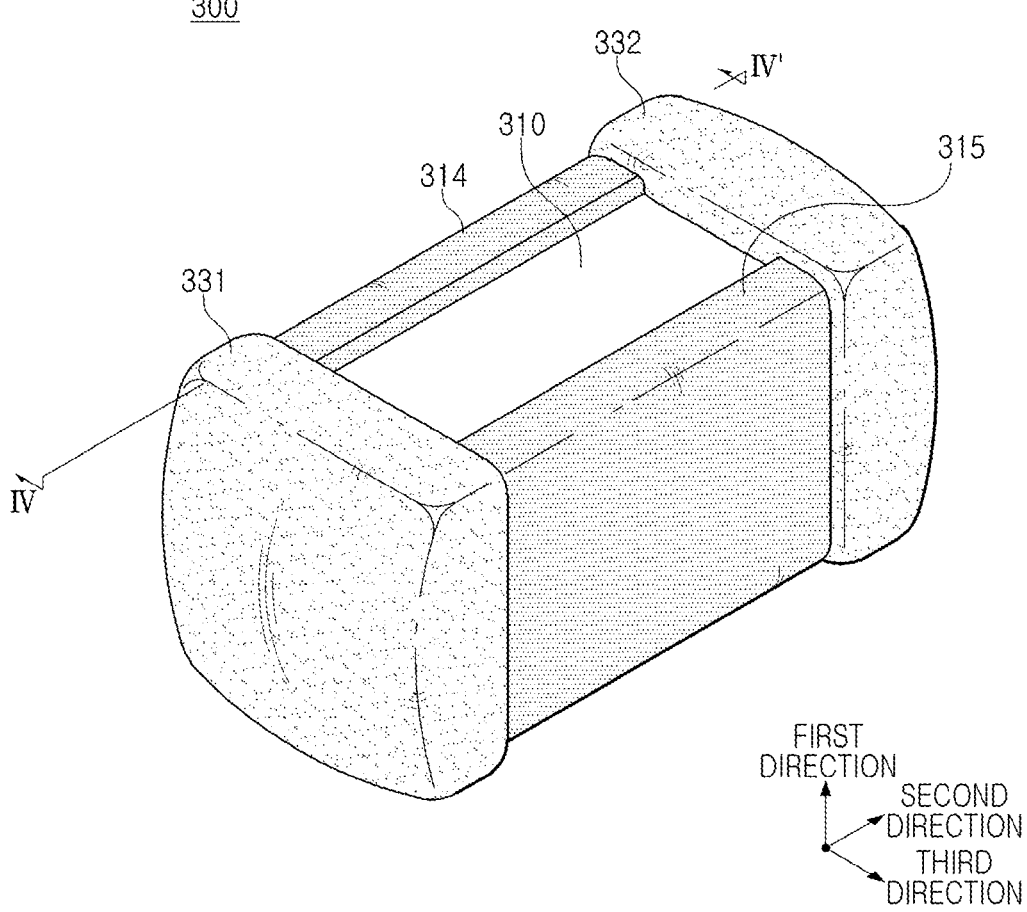
FIG. 15 schematically illustrates a perspective view of a multilayer electronic component according to another embodiment of the present disclosure.

FIG. 15 schematically illustrates a perspective view of a multilayer electronic component according to another embodiment of the present disclosure.

Figure 16:
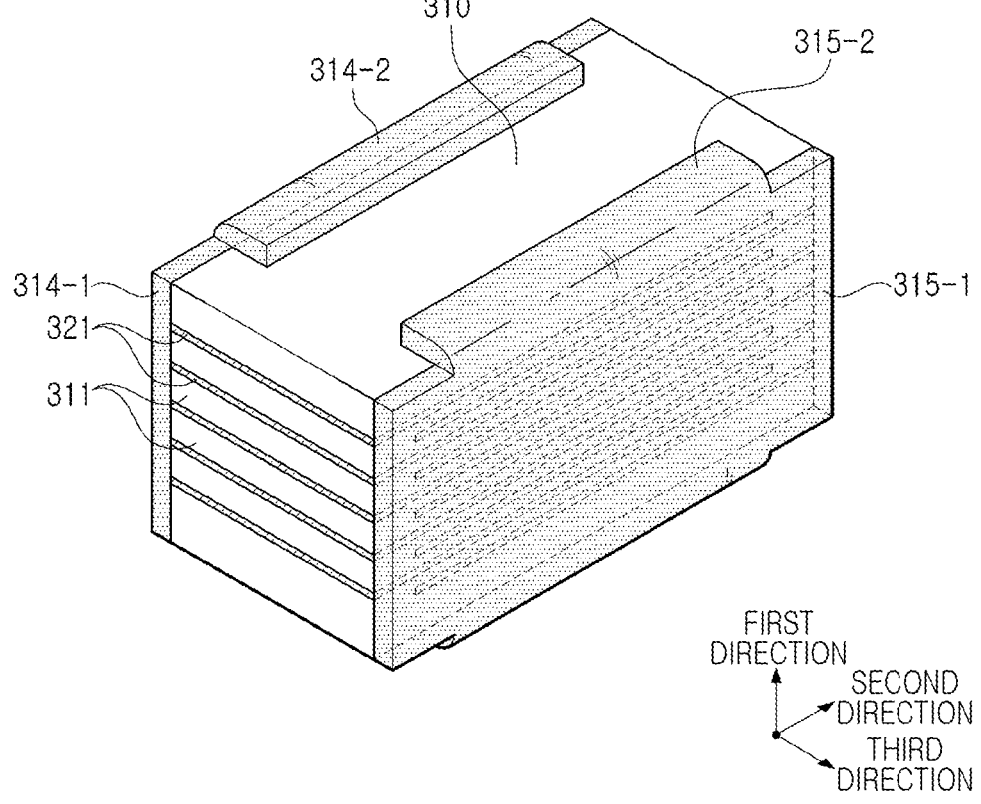
FIG. 16 schematically illustrates a perspective view of the multilayer electronic component of FIG. 15 excluding an external electrode.

FIG. 16 schematically illustrates a perspective view of the multilayer electronic component of FIG. 15 excluding an external electrode.

Figure 17:
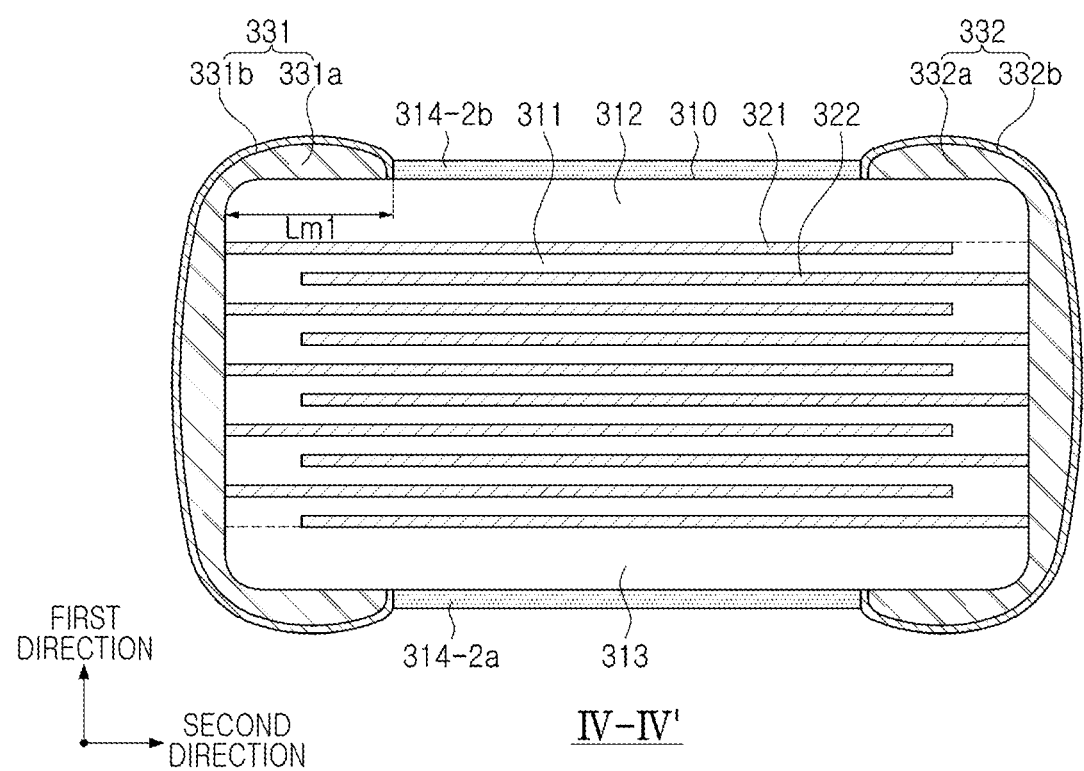
FIG. 17 schematically illustrates a cross-sectional view of FIG. 15, taken along line IV-IV'.

FIG. 17 schematically illustrates a cross-sectional view of FIG. 15, taken along line IV-IV'.

Hereinafter, a multilayer electronic component according to an example embodiment of the present disclosure will be described in detail with reference to FIGS. 1 to 17. A multilayer ceramic capacitor will be described as an example of a multilayer electronic component, but the example embodiment may also be applied to various electronic products using a dielectric composition, such as an inductor, a piezoelectric element, a varistor, a thermistor, or the like.

A multilayer electronic component 100 according to an embodiment of the present disclosure may include a body 110 including a dielectric layer 111 and an internal electrode (121 and 122) alternately disposed with the dielectric layer 111 in a first direction, and including first and second surfaces 1 and 2 opposing each other, third and fourth surfaces 3 and 4 connected to the first and second surfaces 1 and 2 and opposing each other in a second direction, and fifth and sixth surfaces 5 and 6 connected to first to fourth surfaces 1, 2, 3, and 4 and opposing each other in a third direction; external electrodes 131 and 132 disposed on the third and fourth surfaces 3 and 4; and first and second side margin portions 114 and 115 respectively disposed on the fifth and sixth surfaces 5 and 6, wherein the first and second side margin portions 114 and 115 may include a first extension portion (114-2 and 115-2) disposed to extend onto portions of the first and second surfaces 1 and 2. The second direction average size (average size along the second direction) and the third direction average size (average size along the third direction) of the multilayer electronic component may be measured by an optical microscope. Other methods and/or tools appreciated by one of ordinary skill in the art, even if not described in the present disclosure, may also be used.

The body 110 may include the dielectric layer 111 and the internal electrode (121 and 122), alternately stacked.

More specifically, the body 110 may include a first internal electrode 121 and a second internal electrode 122, disposed in the body 110 and alternately arranged to face each other with the dielectric layer 111 therebetween, to include a capacitance forming portion Ac that forms capacitance.

Although the specific shape of the body 110 is not particularly limited, the body 110 may have a hexahedral shape or the like, as illustrated. Due to shrinkage of ceramic powder particles included in the body 110 during a sintering process, the body 110 may not have a perfectly straight hexahedral shape, but may have a substantially hexahedral shape.

The body 110 may include first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3, and 4 and opposing each other in the third direction.

A plurality of dielectric layers 111 forming the body 110 may be in a sintered state, and a boundary between adjacent dielectric layers 111 may be integrated to such an extent that it may be difficult to identify the same without using a scanning electron microscope (SEM).

A raw material for forming the dielectric layer 111 is not particularly limited, as long as sufficient capacitance may be obtained therewith. For example, a barium titanate-based material, a lead composite perovskite-based material, a strontium titanate-based material, or the like may be used. The barium titanate-based material may include a $BaTiO_3$-based ceramic powder, and examples of the ceramic powder may include $BaTiO_3$, or $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1, 0<y<1$), $Ba(Ti_{1-y}Zr_y)O_3$ ($0<y<1$), or the like, in which calcium (Ca), zirconium (Zr), or the like is partially dissolved in $BaTiO_3$, or the like.

In addition, various ceramic additives, organic solvents, binders, dispersants, or the like may be added to the powder of barium titanate ($BaTiO_3$), and the like, as the raw material for forming the dielectric layer 111.

A thickness td of the dielectric layer 111 does not need to be particularly limited.

To more easily achieve miniaturization and high capacitance of the multilayer electronic component, the thickness of the dielectric layer 111 may be 0.6 μm or less, more preferably 0.4 μm or less.

In this case, the thickness td of the dielectric layer 111 may mean the thickness td of the dielectric layer 111 disposed between the first and second internal electrodes 121 and 122.

The thickness td of the dielectric layer 111 may mean a size of the dielectric layer 111 in the first direction. Also, the thickness td of the dielectric layer 111 may mean an average thickness td of the dielectric layer 111, and may mean a first direction average size (average size along the first direction) of the dielectric layer 111.

The first direction average size of the dielectric layer 111 may be measured by scanning images of cross-sections of the body 110 in the first and second directions with a scanning electron microscope (SEM) at a magnification of 10,000. More specifically, the first direction average size of one dielectric layer 111 means an average value calculated by measuring a size of one dielectric layer 111 in the second direction at thirty (30) equally spaced points in the scanned image in the first direction. The thirty (30) equally spaced points may be designated in the capacitance forming portion Ac. In addition, when such an average value is determined by extensively using measurements of average values to ten (10) dielectric layers 111, the first direction average size of the dielectric layers 111 may be further generalized.

The internal electrode (121 and 122) may be alternately stacked with the dielectric layer 111.

The internal electrode (121 and 122) may include a first internal electrode 121 and a second internal electrode 122, and the first and second internal electrodes 121 and 122 may be alternately disposed to oppose each other with the dielectric layers 111, constituting the body 110, interposed therebetween, and may be exposed from the third and fourth surfaces 3 and 4 of the body 110, respectively.

More specifically, the first internal electrode 121 may be spaced apart from the fourth surface 4, and may be exposed from the third surface 3 while contacting the third surface 3, and the second internal electrode 122 may be spaced apart from the third surface 3 and may be exposed from the fourth surface 4 while contacting the fourth surface 4. A first external electrode 131 may be disposed on the third surface 3 of the body 110 and connected to the first internal electrode 121, and a second external electrode 132 may be disposed on the fourth surface 4 of the body 110 and connected to the second internal electrode 122.

For example, the first internal electrode 121 may not be connected to the second external electrode 132, but may be connected to the first external electrode 131, and the second internal electrode 122 may not be connected to the first external electrode 131, but may be connected to the second external electrode 132. In this case, the first and second internal electrodes 121 and 122 may be electrically separated from each other by the dielectric layer 111 interposed therebetween.

The body 110 may be formed by alternately stacking a ceramic green sheet on which the first internal electrode 121 is printed and a ceramic green sheet on which the second internal electrode 122 is printed, and then sintering the stacked ceramic green sheets.

A material for forming the internal electrode (121 and 122) not particularly limited, and a material having excellent electrical conductivity may be used. For example, the internal electrode (121 and 122) may include nickel (Ni), copper (Cu), palladium (Pd), silver (Ag), gold (Au), platinum (Pt), tin (Sn), tungsten (W), titanium (Ti), and alloys thereof.

In addition, the internal electrode (121 and 122) may be formed by printing a conductive paste for the internal electrodes containing one or more of nickel (Ni), copper (Cu), palladium (Pd), silver (Ag), gold (Au), platinum (Pt), tin (Sn), tungsten (W), titanium (Ti), and alloys thereof, on the ceramic green sheets. As a printing method of the conductive paste for the internal electrodes, a screen-printing method, a gravure printing method, or the like may be used, but the present disclosure is not limited thereto.

A thickness te of the internal electrode (121 and 122) does not need to be particularly limited.

To more easily achieve miniaturization and high capacitance of the multilayer electronic component, the thickness of the internal electrode (121 and 122) may be 0.6 $\mu$m or less, more preferably 0.4 $\mu$m or less.

In this case, the thickness te of the internal electrode (121 and 122) may mean a size of the internal electrode (121 and 122) in the first direction. In addition, the thickness te of the internal electrode (121 and 122) may mean an average thickness te of the internal electrode (121 and 122), and may mean a first direction average size of the internal electrode (121 and 122).

The first direction average size of the internal electrode (121 and 122) may be measured by scanning images of cross-sections of the body 110 in the first and second directions with a scanning electron microscope (SEM) at a magnification of 10,000. More specifically, the first direction average size of one internal electrode may be an average value calculated by measuring a size of one internal electrode in the second direction at thirty (30) equally spaced points in the scanned image. The thirty (30) equally spaced points may be designated in the capacitance forming portion Ac. In addition, when such an average value is determined by extensively using measurements of average values to ten (10) internal electrodes (121 and 122), the first direction average size of the internal electrode (121 and 122) may be further generalized.

The body 110 may include cover portions 112 and 113 disposed on both end-surfaces of the capacitance forming portion Ac in the first direction.

More specifically, the cover portions 112 and 113 may include an upper cover portion 112 disposed above the capacitance forming portion Ac in the first direction, and a lower cover portion 113 disposed below the capacitance forming portion Ac in the first direction.

The upper cover portion 112 and the lower cover portion 113 may be formed by stacking a single dielectric layer 111 or two or more dielectric layers 111 on upper and lower surfaces of the capacitance forming portion Ac in the first direction, respectively, and may basically play a role in preventing damage to the internal electrode (121 and 122) due to physical or chemical stress.

The upper cover portion 112 and the lower cover portion 113 may not include the internal electrode (121 and 122), and may include the same material as the dielectric layer 111. For example, the upper cover portion 112 and the lower cover portion 113 may include a ceramic material, and may include, for example, a barium titanate (BaTiO$_3$)-based ceramic material.

A thickness tc of each of the cover portions 112 and 113 does not need to be particularly limited.

To more easily achieve miniaturization and high capacitance of the multilayer electronic component, the thickness tc of each of the cover portions 112 and 113 may be 100 $\mu$m or less, preferably 30 $\mu$m or less, and, in case of ultra-small products, more preferably 20 $\mu$m or less.

In this case, the thickness tc of each of the cover portions 112 and 113 may mean a size of each of the cover portions 112 and 113 in the first direction. In addition, the thickness tc of each of the cover portions 112 and 113 may mean an average thickness tc of each of the cover portions 112 and 113, and may mean a first direction average size of each of the cover portions 112 and 113.

The first direction average size of each of the cover portions 112 and 113 in the first direction may be measured by scanning images of cross-sections of the body 110 in the first and second directions with a scanning electron microscope (SEM) at a magnification of 10,000. More specifically, the first direction average size may be an average value calculated by measuring the size in the first direction at thirty (30) equally spaced points in the second direction in the scanned image of one cover portion.

In addition, the first direction average size of the cover portion measured by the above-described method may be substantially the same as the first direction average size of the cover portion, in cross-sections of the body 110 in the first and third directions.

Side margin portions 114 and 115 may be disposed on both end-surfaces of the body 110 in the third direction.

More specifically, the side margin portions 114 and 115 may include a first side margin portion 114 disposed on the fifth surface 5 of the body 110, and a second side margin portion 115 disposed on the sixth surface 6 of the body 110. For example, the side margin portions 114 and 115 may be disposed on both end-surfaces of the body 110 in the third direction.

As illustrated, the side margin portions 114 and 115 may refer to regions between both ends of the body 110 in the first and third directions and a boundary surface of the body 110, in a cross-section of the body 110 cut in the first and third directions.

The side margin portions 114 and 115 may basically play a role in preventing damage to the internal electrode (121 and 122) due to physical or chemical stress.

The side margin portions 114 and 115 may be prepared by applying a conductive paste on a ceramic green sheet to form the internal electrode (121 and 122), except for a portion in which the side margin portions 114 and 115 are formed, and, to suppress a step difference due to the internal electrode (121 and 122), cutting the internal electrode (121 and 122) to expose the fifth and sixth surfaces 5 and 6 of the body 110, and then stacking a single dielectric layer 111 or two or more dielectric layers 111 in the third direction on both end-surfaces of the capacitance forming portion Ac in the third direction.

The first side margin portion 114 and the second side margin portion 115 may not include the internal electrode (121 and 122), and may include the same material as the dielectric layer 111. For example, the first side margin portion 114 and the second side margin portion 115 may include a ceramic material, and may include, for example, a barium titanate (BaTiO$_3$)-based ceramic material. In addition, as a raw material forming the side margin portions 114 and 115, various ceramic additives, organic solvents, binders, dispersants, or the like may be added to particles such as barium titanate (BaTiO₃) or the like, according to the purpose of the present disclosure.

For example, the first and second side margin portions 114 and 115 may include at least one of tin (Sn) or gallium (Ga).

Tin (Sn) may control the grain growth of dielectric grains, and when added in an appropriate amount, an average size of dielectric grains may be small, and size distribution may be narrowed, to improve moisture resistance reliability, and to improve electrical properties including dielectric breakdown voltage (BDV), or the like, or mechanical properties including impact resistance, crack resistance, or the like.

A preferred added amount of tin (Sn) may be 0.1 mole or more and 5.0 mole or less, relative to 100 moles of a main component of a base material.

Gallium (Ga) may be a low-temperature sintering aid, and may impart economical advantages because it may reduce a process time by lowering a sintering completion temperature, and may improve moisture resistance reliability, electrical properties, mechanical properties, and the like by suppressing occurrence of pores located at a triple point of dielectric grains.

A preferred added amount of gallium (Ga) may be 0.1 mole or more and 3.0 mole or less, relative on 100 moles of the main component of the base material.

A width wm of each of the first and second side margin portions 114 and 115 does not need to be particularly limited.

To more easily achieve miniaturization and high capacitance of the multilayer electronic component 100, the width wm of each of the first and second side margin portions 114 and 115 may be 100 μm or less, and preferably 30 μm or less, and, in case of ultra-small products, more preferably 20 μm or less.

In this case, the width wm of each of the side margin portions 114 and 115 may mean a size of each of the side margin portions 114 and 115 in the third direction. Also, the width wm of each of the side margin portions 114 and 115 may mean an average width wm of each of the side margin portions 114 and 115, and may mean a third direction average size of each of the side margin portions 114 and 115.

The third direction average size of each of the side margin portions 114 and 115 may be measured by scanning images of cross-sections of the body 110 in the first and third directions with a scanning electron microscope (SEM) at a magnification of 10,000. More specifically, the third direction average size may refer to an average value calculated by measuring sizes in the third direction at ten (10) equally spaced points in the first direction in a scanned image of one side margin. Other methods and/or tools appreciated by one of ordinary skill in the art, even if not described in the present disclosure, may also be used.

To make a multilayer ceramic capacitor to have a small size with high capacitance, maximization of an effective area (an increase in an effective volume fraction necessary for realizing capacitance) of an electrode is required. In order to implement a multilayer ceramic capacitor having a small size with high capacitance, as described above, in manufacturing the multilayer ceramic capacitor, an internal electrode may be exposed in a width direction of a body to maximize an area in a width direction of the internal electrode by a margin-free design, but, after manufacturing the body and before a sintering operation, a method in which a ceramic green sheet for a side margin portion is separately attached to a surface of the electrode exposed in the width direction of the body, may be applied.

As the side margin portion is formed by the method in which a ceramic green sheet for a side margin portion is separately attached, capacitance per unit volume of the capacitor may be improved, but there may be risks that penetration of external moisture or penetration of a plating solution during a plating process through an interface joint portion between the body and the side margin portion causes various problems such as shortening of a lifespan of a chip, occurrence of defects, or the like.

In addition, pores created on an interface between the body and the side margin portion may cause concentration of an electrical field, which may cause a problem of decreasing a breakdown voltage (BDV), a decrease in sintering density due to the pores may cause a decrease in moisture resistance reliability, and as an interfacial joint portion occurs on a boundary between the body and the side margin portion, a decrease in bonding strength and accordingly a decrease in moisture resistance reliability may occur.

In the present disclosure, a side margin portion may be formed to further extend, compared to a conventional side margin portion, to cover a body, to block or move away a penetration path of external moisture or a plating solution that may penetrate through an interface joint portion between the body and the side margin portion, to improve the above-mentioned problems. In addition, components included in the side margin portion may be controlled to suppress occurrence of pores to improve a density of a microstructure, to further improve moisture resistance reliability.

The first and second side margin portions 114 and 115, according to an embodiment of the present disclosure, may include a first extension portion (114-2 and 115-2) disposed to extend onto portions of the first and second surfaces, respectively.

More specifically, the first side margin portion 114 may include a main portion 114-1 disposed on the fifth surface 5 of the body, and a first extension portion 114-2 disposed to extend from the main portion 114-1 to a portion of the first surface 1 and a portion of the second surface 2, respectively, and the first extension portion 114-2 of the first side margin portion may include a 1-1 extension portion 114-2a disposed to extend onto a portion of the first surface 1, and a 1-2 extension portion 114-2b disposed to extend onto a portion of the second surface 2.

The second side margin portion 115 may include a main portion 115-1 disposed on the sixth surface 6 of the body, and a first extension portion 115-2 disposed to extend from the main portion 115-1 to a portion of the first surface 1 and a portion of the second surface 2, respectively, and the first extension portion 115-2 of the second side margin portion may include a 1-1 extension portion 115-2a disposed to extend onto a portion of the first surface 1, and a 1-2 extension portion 115-2b disposed to extend onto a portion of the second surface 2.

The first extension portion (114-2 and 115-2) may include a corner region not contacting the first and second surfaces 1 and 2 of the body, and a region contacting the first and second surfaces 1 and 2 of the body.

In the present disclosure, a description of the first extension portion (114-2 and 115-2) may correspond to, unless specifically stated otherwise, descriptions of the 1-1 extension portion 114-2a of the first side margin portion, the 1-2 extension portion 114-2b of the first side margin portion, the 1-1 extension portion 115-2a of the second side margin portion, and the 1-2 extension portion 115-2b of the second side margin portion, respectively.

The first and second side margin portions 114 and 115 may be disposed on portions of the first and second surfaces 1 and 2 of the body to include the first extension portion (114-2 and 115-2), to improve moisture resistance reliability by effectively preventing penetration of external moisture or a plating liquid.

For example, the first extension portions 114-2a, 114-2b, 115-2a, and 115-2b of the first and second side margin portions may be arranged to cover portions of the first and second surfaces 1 and 2 of the body, to improve moisture resistance reliability. Specifically, external moisture or a plating solution may be penetrated through a joint interface portion at which the main portion (114-1 and 115-1) and the fifth and sixth surfaces 5 and 6 of the body are in contact with, causing problems such as deterioration of an internal electrode or the like. The first extension portions 114-2a, 114-2b, 115-2a, and 115-2b may be arranged to cover the joint interface portion, to suppress penetration of external moisture or a plating solution and improve moisture resistance reliability.

In this case, a third direction average size of each of the first extension portions of the first and second side margin portions, contacting one surface of the body, may be greater than 0% and less than 50% of a third direction average size of the body 110, and a preferred lower limit value thereof may be 5% or more, 10% or more, or 15% or more. The third direction average size and the second direction average size of the body 110 may be measured by SEM. Other methods and/or tools appreciated by one of ordinary skill in the art, even if not described in the present disclosure, may also be used.

In this case, the statement mentioning that the third direction average size of one first extension portion contacting one surface of the body is less than 50% of the third direction average size of the body means that the first extension portion of the first and second side margin portions is not observed when a cross-section in the first and second directions is observed from a center of the body in the third direction, with reference to FIG. 5. In addition, the statement mentioning that the third direction average size of one first extension portion contacting one surface of the body is greater than 0% of the third direction average size of the body means that the first extension portion (114-2a and 114-2b) of the first side margin portion is observed when first and second cross-sections at positions spaced apart from each other by a certain distance are observed toward the center of the body in the third direction from the fifth surface 5 of the body, with reference to FIG. 6. In this case, "the first extension portion contacting one surface of the body" may refer to a region of the first extension portion contacting the first and second surfaces 1 and 2 of the body, may mean a region of the first extension portion that does not exceed an outward direction of the third direction, based on extension lines of the fifth and sixth surfaces, and, for example, may refer to a region having a size W1 among the 1-1 extension portion 114-2a of the first side margin portion, contacting the first surface of the body, as illustrated in FIG. 7.

A third direction average size W1 of each of the first extension portions contacting one surface of the body may refer to, for example, an average value of third direction size values of the first extension portion contacting one surface of the body at five (5) points, equal intervals in the second direction from a second direction center of one first extension portion, and an error of the third direction size values of the first extension portion contacting one surface of the body may be 5% or less and may be substantially a straight line. For example, the first extension portion contacting one surface of the body may be straight in the second direction.

When the first extension portions 114-2a, 114-2b, 115-2a, and 115-2b do not contact the first and second surfaces 1 and 2 of the body (W1=0), there may be only a shape extending in the first direction from the first main portion (114-1 and 115-1) disposed on the fifth and sixth surfaces 5 and 6, and penetration path of external moisture may not be different from a conventional one, and moisture resistance reliability may not be improved, as compared to a conventional one.

Even when the third direction size of the first extension portions 114-2a, 114-2b, 115-2a, and 115-2b contacting the first and second surfaces 1 and 2 of the body is 50% or more, moisture resistance reliability may be excellent, but moisture resistance reliability may not be further improved as a third direction size increases, or when 50% or more is satisfied simultaneously together with a different first extension portion disposed on the same surface, a region covered between the first extension portions may be formed. As a result, there may be a risk that sizes of multilayer electronic components become thicker.

A first direction average size of each of the 1-1 extension portion 114-2a and the 1-2 extension portion 114-2b of the first side margin portion may be greater than 0% and 110% or less of a third direction average size of the first side margin portion disposed on the fifth surface 5, and a first direction average size of each of the 1-1 extension portion 115-2a and the 1-2 extension portion 115-2b of the second side margin portion may be greater than 0% and 110% or less of a third direction average size of the second side margin portion disposed on the sixth surface 6.

In this case, the third direction average size of each of the first and second side margin portions disposed on the fifth and sixth surfaces 5 and 6 may mean the third direction average size of each of the main portion (114-1 and 115-1) of the first and second side margin portions.

For example, with reference to FIG. 7, the first direction average size of the 1-1 extension portion 114-2a of the first side margin portion is wm1, and the third direction average size of the main portion 114-1 of the first side margin portion disposed on the fifth surface is wm, 0<wm1/wm≤110% may be satisfied. Although the 1-1 extension portion 114-2a of the first side margin portion has been described as an example, the 1-2 extension portion 114-2b of the first side margin portion and the 1-1 extension portion 115-2a and the 1-2 extension portion 115-2b of the second side margin portion may be applied in a similar manner. The first direction average size of each of the 1-1 extension portion and 1-2 extension portion, and the third direction average size of the first side margin portion disposed on the fifth surface may be measured by SEM. Other methods and/or tools appreciated by one of ordinary skill in the art, even if not described in the present disclosure, may also be used.

With reference to FIGS. 9A to 9C, when a gap sheet for the side margin portion is attached to the body before sintering, gap sheets for the side margin portion having the same thickness may be formed to be larger than a size of each of the fifth and sixth surfaces of the body, and may be thus attached to portions of the first and second surfaces of the body by heat compression.

After the gap sheets for the side margin portion are attached to the third and fourth surfaces of the body by heat compression, a polishing process may be performed to wear a corner region.

Therefore, a thickness of a gap sheet for one side margin portion may be substantially constant, and after sintering, a thickness of the side margin portion may also be substantially constant. Referring to the first side margin portion 114 as an example, a ratio wm1/wm of the first direction average size wm1 of the 1-1 extension portion 114-2a of the first side margin portion relative to the third direction average size wm of the main portion 114-1 of the first side margin portion may satisfy 5%≤wm1/wm≤105%, and more preferably 10%≤wm1/wm≤100%. Such a description may be the same for the 1-2 extension portion 114-2b of the first side margin portion, and the 1-1 extension portion 115-2a, and the 1-2 extension portion 115-2b of the second side margin portion may be applied in a similar manner.

When describing a first direction size according to a third direction position of the first extension portion with reference to FIGS. 8A to 8C, wm1a=wm1b=wm1c may be satisfied as illustrated in FIG. 8A (substantially the same, an error value thereof may be 5% or less) means), wm1c'<wm1b'<wm1a' may be satisfied as illustrated in FIG. 8B, and wm1c"<wm1a"<wm1b" may be satisfied as illustrated in FIG. 8C, and an average value of these may be the first direction average size wm1 of one first extension portion contacting one surface of the body.

In addition, among the side margin portions 114 and 115, the third direction average size of each of the main portions 114-1 and 115-1 may be 30 μm or less, and the first direction size of each of the first extension portions 114-2 and 115-2 may be 30 μm or less.

In an embodiment of the present disclosure, a structure in which the multilayer electronic component 100 has two external electrodes 131 and 132 are illustrated, but the number, shapes, or the like of external electrodes 131 and 132 may be changed, depending on a shape of the internal electrode (121 and 122), or other purposes.

The external electrodes 131 and 132 may be disposed on the body 110, and may be connected to the internal electrode (121 and 122).

More specifically, the external electrodes 131 and 132 may include first and second external electrodes 131 and 132 disposed on the third and fourth surfaces 3 and 4 of the body 110, respectively, and may be connected to the first and second internal electrodes 121 and 122, respectively. For example, the first external electrode 131 may be disposed on the third surface 3 of the body, and may be connected to the first internal electrode 121, and the second external electrode 132 may be disposed on the fourth surface 4 of the body, and may be connected to the second internal electrode 122.

Additionally, the external electrodes 131 and 132 may be disposed to extend onto portions of the first and second surfaces 1 and 2 of the body 110, or may be disposed to extend onto portions of the fifth and sixth surfaces 5 and 6 of the body 110. For example, the first external electrode 131 may be disposed on portions of the first, second, fifth, and sixth surfaces 1, 2, 5, and 6 of the body 110, and on the third surface 3 of the body 110, and the second external electrode 132 may be disposed on portions of the first, second, fifth, and sixth surfaces 1, 2, 5, and 6 of the body 110, and on the third surface 3 of the body 110.

When the external electrodes 131 and 132 are disposed on the side margin portion, the external electrodes may be disposed as thick as a thickness of the side margin portion, and as illustrated in FIG. 1, in a region on which the side margin portion is disposed, a relatively thick external electrode may be disposed to have a convex shape. In a region on which the side margin portion is not disposed, a relatively thin external electrode may be disposed to have a concave shape.

The external electrodes 131 and 132 may be formed of any material as long as they have electrical conductivity, such as metal or the like, and a specific material may be determined in consideration of electrical characteristics, structural stability, or the like, and may further have a multilayer structure.

For example, the external electrodes 131 and 132 may include electrode layers 131a and 132a disposed on the body 110, and plating layers 131b and 132b disposed on the electrode layers 131a and 132a.

As a more specific example of the electrode layers 131a and 132a, the electrode layers 131a and 132a may be sintered electrodes including a conductive metal and glass or resin-based electrodes including a conductive metal and a resin.

In addition, the electrode layers 131a and 132a may have a form in which the sintered electrode and the resin-based electrode are sequentially formed on the body 110.

In addition, the electrode layers 131a and 132a may be formed by transferring a sheet containing the conductive metal onto the body 110, or may be formed by transferring a sheet containing the conductive metal onto the sintered electrode.

As the conductive metal used for the electrode layers 131a and 132a, a material that may be electrically connected to the internal electrode (121 and 122) to form capacitance may be used, but is not particularly limited thereto. For example, the conductive metal may include one or more of nickel (Ni), copper (Cu), palladium (Pd), silver (Ag), gold (Au), platinum (Pt), tin (Sn), tungsten (W), titanium (Ti), and alloys thereof. The electrode layers 131a and 132a may be formed by applying a conductive paste prepared by adding glass frit to a conductive metal powder and then sintering the same.

The plating layer (131b and 132b) may serve to improve mounting characteristics.

A type of the plating layer (131b and 132b) is not particularly limited, may be provided as a single plating layer (131b and 132b) containing at least one of nickel (Ni), tin (Sn), palladium (Pd), or an alloy thereof, and may be formed as a plurality of layers.

For a more specific example of the plating layer (131b and 132b), the plating layer (131b and 132b) may be an Ni plating layer or an Sn plating layer, and the Ni plating layer and the Sn plating layer may be sequentially formed on the electrode layer (131a and 132a). The Sn plating layer, the Ni plating layer, and the Sn plating layer may be sequentially formed. In addition, the plating layer (131b and 132b) may include a plurality of Ni plating layers and/or a plurality of Sn plating layers.

A size of the multilayer electronic component 100 is not particularly limited.

To achieve a small size with high capacitance, thicknesses of the dielectric layer and internal electrode should be thinned to increase the number of stacks. Therefore, an effect according to the present disclosure may become more noticeable in a multilayer electronic component 100 having a size of 1005 (length×width: 1.0 mm×0.5 mm) or less.

In a multilayer electronic component 200 according to another embodiment of the present disclosure, first and second side margin portions 214 and 215 may further include second extension portions 214-3 and 215-3 disposed to extend onto portions of third and fourth surfaces 3 and 4.

In a description of the multilayer electronic component 200 described below, descriptions of the same contents as the above-described multilayer electronic component 100 will be omitted.

More specifically, the first side margin portion 214 may include a second extension portion 214-3 disposed to extend from a main portion 214-1 to a portion of the third surface 3 and a portion of the fourth surface 4 of a body, respectively, and the second extension portion 214-3 of the first side margin portion may include a 2-1 extension portion 214-3a disposed to extend onto a portion of the third surface 3, and a 2-2 extension portion 214-3b (not illustrated) disposed to extend onto a portion of the fourth surface 4. The 2-2 extension portion of the first side margin portion is not illustrated in the drawings, but will be described with reference numeral 214-3b to facilitate understanding of the present disclosure, and can be easily understood by those skilled in the art.

The second side margin portion 215 may include a second extension portion 215-3 disposed to extend from a main portion 215-1 to a portion of the third surface 3 and a portion of the fourth surface 4 of the body, respectively, and the second extension portion 215-3 of the second side margin portion may include a 2-1 extension portion 215-3a disposed to extend onto a portion of the third surface 3, and a 2-2 extension portion 215-3b (not illustrated) disposed to extend onto a portion of the fourth surface 4. The 2-2 extension portion 215-3b of the second side margin portion is not illustrated in the drawings, but will be described with reference numeral 215-3b to facilitate understanding of the present disclosure, and can be easily understood by those skilled in the art.

The second extension portion (214-3 and 215-3) may include a corner region not contacting the third and fourth surfaces 3 and 4 of the body, and a region contacting the third and fourth surfaces 3 and 4 of the body.

In the present disclosure, a description of the second extension portion (214-3 and 215-3) may correspond to, unless specifically stated otherwise, descriptions of the 2-1 extension portion 214-3a of the first side margin portion, the 2-2 extension portion 214-3b of the first side margin portion, the 2-1 extension portion 215-3a of the second side margin portion, and the 2-2 extension portion 215-3b of the second side margin portion, respectively.

The first and second side margin portions 214 and 215 may be disposed on portions of the third and fourth surfaces 3 and 4 of the body to further include the second extension portion (214-3 and 215-3), to improve moisture resistance reliability by effectively preventing penetration of external moisture or a plating liquid.

For example, the second extension portions 214-3a, 214-3b, 215-3a, and 215-3b of the first and second side margin portions may be arranged to cover portions of the third and fourth surfaces 3 and 4 of the body, to improve moisture resistance reliability. Specifically, external moisture or a plating solution may be penetrated through a joint interface portion at which the main portion (214-1 and 215-1) and the fifth and sixth surfaces 5 and 6 of the body are in contact with, causing problems such as deterioration of an internal electrode or the like. The second extension portions 214-3a, 214-3b, 215-3a, and 215-3b may be arranged to cover the joint interface portion, to suppress penetration of external moisture or a plating solution and improve moisture resistance reliability.

In this case, a third direction average size of each of the second extension portions 214-3a, 214-3b, 215-3a, and 215-3b of the first and second side margin portions, contacting one surface of the body, may be greater than 0% and less than 50% of a third direction average size of the body 110, and a preferred lower limit value thereof may be 5% or more, 10% or more, or 15% or more.

In case, "the second extension portion contacting one surface of the body" may refer to a region of the second extension portion contacting the third and fourth surfaces 3 and 4 of the body, may mean a region of the second extension portion that does not exceed an outward direction of the third direction, based on extension lines of the fifth and sixth surfaces, and, for example, may refer to a region having a size W2 among the 2-1 extension portion 214-3a of the first side margin portion, contacting the third surface of the body, as illustrated in FIG. 12.

A third direction average size W2 of each of the second extension portions contacting one surface of the body may refer to, for example, an average value of third direction size values of the second extension portion contacting one surface of the body at five (5) points, equal intervals in the first direction from a first direction center of each of the second extension portions, based on first and third direction cross-sections of the multilayer electronic component including the second extension portion, or a direction in which the multilayer electronic component including the second extension portion is viewed from the outside in the second direction toward the third surface, after removing the electrode, and an error of the third direction size values of the second extension portion contacting one surface of the body may be 5% or less and may be substantially a straight line. For example, the second extension portion contacting one surface of the body may be straight in the first direction. The third direction average size of each of the second extension portions 214-3a, 214-3b, 215-3a, and 215-3b may be measured by SEM. Other methods and/or tools appreciated by one of ordinary skill in the art, even if not described in the present disclosure, may also be used.

When the second extension portions 214-3a, 214-3b, 215-3a, and 215-3b do not contact the third and fourth surfaces 3 and 4 of the body (W2=0), there may be only a shape extending in the second direction from the first main portion (214-1 and 215-1) disposed on the sixth surfaces 5 and 6, and penetration path of external moisture may not be different from a conventional one, and moisture resistance reliability may not be improved, as compared to a conventional one.

Even when the third direction size of the second extension portions 214-3a, 214-3b, 215-3a, and 215-3b contacting the third and fourth surfaces 3 and 4 of the body is 50% or more, moisture resistance reliability may be excellent, but moisture resistance reliability may not be further improved as a third direction size increases, or when 50% or more is satisfied simultaneously together with a different second extension portion disposed on the same surface, a region covered between the second extension portions may be formed. As a result, there may be a risk that sizes of multilayer electronic components become thicker.

A second direction average size wm2 of each of the 2-1 extension portion 214-3a and the 2-2 extension portion 214-3b of the first side margin portion may be greater than 0% and 110% or less of a third direction average size of the first side margin portion disposed on the fifth surface 5, and a second direction average size of each of the 2-1 extension portion 215-3a and the 2-2 extension portion 215-3b of the second side margin portion may be greater than 0% and 110% or less of a third direction average size of the second side margin portion disposed on the sixth surface 6.

In this case, the third direction average size of each of the first and second side margin portions disposed on the fifth and sixth surfaces 5 and 6 may mean the third direction average size of each of the main portion (214-1 and 215-1) of the first and second side margin portions.

For example, with reference to FIGS. 11 and 12, the second direction average size of the 2-1 extension portion 214-3a of the first side margin portion is wm2, and the third direction average size of the first side margin portion disposed on the fifth surface 5 is wm, 0<wm2/wm≤110% may be satisfied. Although the 2-1 extension portion 214-3a of the first side margin portion has been described as an example, the 2-2 extension portion 214-3$b$ of the first side margin portion and the 2-1 extension portion 215-3$a$ and the 2-2 extension portion 215-3$b$ of the second side margin portion may be applied in a similar manner. The second direction average size of each of the 2-1 extension portion and 2-2 extension portion may be measured by SEM. Other methods and/or tools appreciated by one of ordinary skill in the art, even if not described in the present disclosure, may also be used.

With reference to FIGS. 13A to 13C, when a gap sheet for the side margin portion is attached to the body before sintering, gap sheets for the side margin portion having the same thickness may be formed to be larger than a size of each of the fifth and sixth surfaces of the body, and may be thus attached to portions of the first and second surfaces of the body by heat compression.

After the gap sheets for the side margin portion are attached to the third and fourth surfaces of the body by heat compression, a polishing process may be performed to wear a corner region.

Therefore, a thickness of a gap sheet for one side margin portion may be substantially constant, and after sintering, a thickness of the side margin portion may also be substantially constant. Referring to the first side margin portion 214 as an example, a ratio wm2/wm of the first direction average size wm2 of the 2-1 extension portion 214-3$a$ of the first side margin portion relative to the third direction average size wm of the main portion 214-1 of the first side margin portion may satisfy 5%≤wm2/wm≤105%, and more preferably 10%≤wm2/wm≤100%. Such a description may be the same for the 2-2 extension portion 214-3$b$ of the first side margin portion, and the 2-1 extension portion 215-3$a$, and the 2-2 extension portion 215-3$b$ of the second side margin portion may be applied in a similar manner.

In addition, among the side margin portions 214 and 215, the third direction average size of each of the main portion 214-1 and 215-1 may be 30 μm or less, the first direction size of each of the first extension portion 214-2 and 215-2 may be 30 μm or less, and the second direction size of each of the second extension portions 214-3 and 215-3 may be 30 μm or less.

In an embodiment of the present disclosure, at least a portion of the first extension portions 214-2 and 215-2 may be arranged to contact the second extension portions 214-3 and 215-3.

More specifically, at least a portion of the first extension portions 214-2 and 215-2 may be arranged to contact the second extension portions 214-3 and 215-3 at corners of the body, to improve moisture resistance reliability by further suppressing penetration of external moisture or a plating liquid.

A shape of contact between at least a portion of the first extension portions 214-2 and 215-2 (including the 1-1 extension portions 214-2$a$ and 215-2$a$ and the 1-2 extension portions 214-2$b$ and 215-2$b$) and the second extension portions 214-3 and 215-3 is not particularly limited, and as illustrated in FIG. 14, when a gap sheet for the side margin portion is attached to the body before sintering, various shapes may be formed by cutting a shape of a region of the gap sheet for the side margin portion contacting a corner region of the body, as {circle around (1)} to {circle around (5)}. Various cutting methods, such as punching, usage of a laser, or the like may be used, but are not particularly limited thereto.

When the external electrodes 231 and 232 are disposed on the side margin portion, the external electrodes may be disposed as thick as a thickness of the side margin portion, and as illustrated in FIG. 10, in a region on which the side margin portion is disposed, a relatively thick external electrode may be disposed to have a convex shape. In a region on which the side margin portion is not disposed, a relatively thin external electrode may be disposed to have a concave shape.

In a multilayer electronic component 300 according to another embodiment of the present disclosure, first and second side margin portions 314 and 315 may further include first extension portions 314-2 and 315-2 disposed to extend onto portions of first and second surfaces 1 and 2, and the first extension portions 314-2 and 315-2 may be spaced apart from third and fourth surfaces 3 and 4 in the second direction at a certain interval Lm1.

In a description of the multilayer electronic component 300 described below, descriptions of the same contents as the above-described multilayer electronic component 100 and 200 will be omitted.

More specifically, when described with reference to FIGS. 15 to 17, first extension portions 314-2$a$ and 314-2$b$ of the first side margin portion may be spaced apart from third and fourth surfaces 3 and 4, respectively, in the second direction, and first extension portions 315-2$a$ and 315-2$b$ of the second side margin portion may be spaced apart from each of the third and fourth surfaces 3 and 4 in the second direction. For example, main portions 314-1 and 315-1 and first extension portions 314-2 and 315-2 of the side margin portion may include a region not contacting each other.

Thereafter, when applying external electrodes 331 and 332 to first and second surfaces 1 and 2, the external electrodes 331 and 332 may be applied only up to a region on which the first extension portions 314-2 and 315-2 are disposed, and as the external electrodes 331 and 332 do not cover the first extension portions 314-2 and 315-2, the external electrodes 331 and 332 may be prevented from becoming thicker outward in the first direction, to reduce a thickness and a size of the multilayer electronic component 300.

For example, in the multilayer electronic component 300 according to the present embodiment, unlike the multilayer electronic components 100 and 200 according to another embodiment, the external electrode may not be disposed on the side edge portion. Therefore, the external electrode may not be disposed as thickly as a thickness of the side margin portion. As the external electrode is disposed in a region on which the side margin portion is not disposed, as illustrated in FIG. 15, there may be little or no convex or concave shape.

In addition, the expression 'an embodiment' used in this specification does not mean the same embodiment, and may be provided to emphasize and describe different unique characteristics. However, an embodiment presented above may not be excluded from being implemented in combination with features of another embodiment. For example, although the description in a specific embodiment is not described in another example, it can be understood as an explanation related to another example, unless otherwise described or contradicted by the other embodiment.

The terms used in this disclosure are used only to illustrate various examples and are not intended to limit the present inventive concept. Singular expressions include plural expressions unless the context clearly dictates otherwise.

According to one of many effects of the present disclosure, a multilayer electronic component having improved moisture resistance reliability by complementing an interface structure of a body and a side margin portion to prevent permeation of external moisture, may be provided.

According to one of many effects of the present disclosure, a multilayer electronic component having improved breakdown voltage and moisture resistance reliability by reducing the number of pores, may be provided.

However, various advantages and effects of the present disclosure are not limited to the above-described contents, and can be more easily understood in a process of explaining specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including a dielectric layer and an internal electrode alternately disposed with the dielectric layer in a first direction, and including a first surface and a second surface opposing each other in the first direction, a third surface and a fourth surface opposing each other in a second direction and connected to the first and second surfaces, and a fifth surface and a sixth surface opposing each other in a third direction and connected to the first to fourth surfaces;
an external electrode disposed on the third and fourth surfaces; and
a first side margin portion and a second side margin portion disposed on the fifth and sixth surfaces, respectively,
wherein the first and second side margin portions each includes a first extension portion disposed to extend onto a portion of the first surface and a portion of the second surface, and along the second direction, each of the first extension portions of the first and second side margin portions is spaced apart from the third and fourth surfaces by a distance greater than 0.

2. The multilayer electronic component of claim 1, wherein the first extension portion of the first side margin portion comprises a 1-1 extension portion disposed to extend onto a portion of the first surface, and a 1-2 extension portion disposed to extend onto a portion of the second surface, and
the first extension portion of the second side margin portion comprises a 1-1 extension portion disposed to extend onto a portion of the first surface, and a 1-2 extension portion disposed to extend onto a portion of the second surface.

3. The multilayer electronic component of claim 2, wherein an average size along the third direction for each of the 1-1 extension portion of the first side margin portion contacting the first surface, the 1-2 extension portion of the first side margin portion contacting the second surface, the 1-1 extension portion of the second side margin portion contacting the first surface, and the 1-2 extension portion of the second side margin portion contacting the second surface is greater than 0% and less than 50% of an average size of the body along the third direction.

4. The multilayer electronic component of claim 2, wherein an average size along the first direction for each of the 1-1 extension portion and the 1-2 extension portion of the first side margin portion is greater than 0% and 110% or less of an average size along the third direction for the first side margin portion disposed on the fifth surface, and
an average size along the first direction for each of the 1-1 extension portion and the 1-2 extension portion of the second side margin portion is greater than 0% and 110% or less of an average size along the third direction for the second side margin portion disposed on the sixth surface.

5. The multilayer electronic component of claim 1, wherein the first and second side margin portions each further comprises a second extension portion disposed to extend onto a portion of the third surface and a portion of the fourth surface,
wherein a second extension portion of the first side margin portion includes a 2-1 extension portion disposed to extend onto a portion of the third surface, and a 2-2 extension portion disposed to extend onto a portion of the fourth surface, and
a second extension portion of the second side margin portion includes a 2-1 extension portion disposed to extend onto a portion of the third surface, and a 2-2 extension portion disposed to extend onto a portion of the fourth surface.

6. The multilayer electronic component of claim 5, wherein an average size along the third direction for each of the 2-1 extension portion of the first side margin portion contacting the third surface, the 2-2 extension portion of the first side margin portion contacting the fourth surface, the 2-1 extension portion of the second side margin portion contacting the third surface, and the 2-2 extension portion of the second side margin portion contacting the fourth surface is greater than 0% and less than 50% of an average size of the body along the third direction.

7. The multilayer electronic component of claim 5, wherein an average size along the second direction for each of the 2-1 extension portion and the 2-2 extension portion of the first side margin portion is greater than 0% and 110% or less of an average size along the third direction for the first side margin portion disposed on the fifth surface, and
an average size along the second direction for each of the 2-1 extension portion and the 2-2 extension portion of the second side margin portion is greater than 0% and 110% or less of an average size along the third direction for the second side margin portion disposed on the sixth surface.

8. The multilayer electronic component of claim 5, wherein at least a portion of the first extension portion is disposed to contact the second extension portion.

9. The multilayer electronic component of claim 1, wherein an average size along the third direction for each of the first and second side margin portions disposed on the fifth and sixth surfaces, respectively, is 30 μm or less, and
an average size along the first direction for each of a 1-1 extension portion of the first side margin portion, a 1-2 extension portion of the first side margin portion, a 1-1 extension portion of the second side margin portion, and a 1-2 extension portion of the second side margin portion is 30 μm or less.

10. The multilayer electronic component of claim 1, wherein the first and second side margin portions comprise at least one of tin (Sn) and gallium (Ga).

11. The multilayer electronic component of claim 1, wherein an average size along the second direction for the multilayer electronic component is 1.0 mm or less, and an average size along the third direction for the multilayer electronic component is 0.5 mm or less.

12. The multilayer electronic component of claim 2, wherein an average size along the second direction for each of the 1-1 extension portion of the first side margin portion contacting the first surface, the 1-2 extension portion of the first side margin portion contacting the second surface, the 1-1 extension portion of the second side margin portion contacting the first surface, and the 1-2 extension portion of the second side margin portion contacting the second surface is greater than 0% and less than 100% of an average size of the body along the second direction.

13. The multilayer electronic component of claim 2, wherein, along the third direction, the 1-1 extension portion of the first side margin portion is spaced apart from the 1-1 extension portion of the second side margin portion.

14. A multilayer electronic component comprising:
a body including a dielectric layer and an internal electrode alternately disposed with the dielectric layer in a first direction, and including a first surface and a second surface opposing each other in the first direction, a third surface and a fourth surface opposing each other in a second direction and connected to the first and second surfaces, and a fifth surface and a sixth surface opposing each other in a third direction and connected to the first to fourth surfaces;
an external electrode disposed on the third and fourth surfaces; and
a first side margin portion and a second side margin portion disposed on the fifth and sixth surfaces, respectively,
wherein the first and second side margin portions each includes a first extension portion disposed to extend onto a portion of the first surface and a portion of the second surface, and a second extension portion disposed to extend onto a portion of the third surface and a portion of the fourth surface,
wherein at least a portion of the first extension portion is disposed to contact the second extension portion.

15. The multilayer electronic component of claim 14, wherein a second extension portion of the first side margin portion includes a 2-1 extension portion disposed to extend onto a portion of the third surface, and a 2-2 extension portion disposed to extend onto a portion of the fourth surface,
a second extension portion of the second side margin portion includes a 2-1 extension portion disposed to extend onto a portion of the third surface, and a 2-2 extension portion disposed to extend onto a portion of the fourth surface, and
an average size along the third direction for each of the 2-1 extension portion of the first side margin portion contacting the third surface, the 2-2 extension portion of the first side margin portion contacting the fourth surface, the 2-1 extension portion of the second side margin portion contacting the third surface, and the 2-2 extension portion of the second side margin portion contacting the fourth surface is greater than 0% and less than 50% of the average size of the body along the third direction.

16. The multilayer electronic component of claim 14, wherein an average size along the first direction for each of a 1-1 extension portion and a 1-2 extension portion of the first side margin portion and an average size along the second direction for each of a 2-1 extension portion and a 2-2 extension portion of the first side margin portion is greater than 0% and 110% or less of an average size along the third direction for the first side margin portion disposed on the fifth surface, and
an average size along the first direction for each of a 1-1 extension portion and a 1-2 extension portion of the second side margin portion and an average size along the second direction for each of a 2-1 extension portion and a 2-2 extension portion of the second side margin portion is greater than 0% and 110% or less of an average size along the third direction for the second side margin portion disposed on the sixth surface.

17. The multilayer electronic component of claim 14, wherein an average size along the third direction for each of the first and second side margin portions disposed on the fifth and sixth surfaces, respectively, is 30 μm or less,
an average size along the first direction for each of a 1-1 extension portion of the first side margin portion, a 1-2 extension portion of the first side margin portion, a 1-1 extension portion of the second side margin portion, and a 1-2 extension portion of the second side margin portion is 30 μm or less, and
an average size along the second direction for each of a 2-1 extension portion of the first side margin portion, a 2-2 extension portion of the first side margin portion, a 2-1 extension portion of the second side margin portion, and a 2-2 extension portion of the second side margin portion is 30 μm or less.

18. The multilayer electronic component of claim 14, wherein the first extension portion of the first side margin portion includes a 1-1 extension portion disposed to extend onto a portion of the first surface, and a 1-2 extension portion disposed to extend onto a portion of the second surface,
the first extension portion of the second side margin portion includes a 1-1 extension portion disposed to extend onto a portion of the first surface, and a 1-2 extension portion disposed to extend onto a portion of the second surface, and
an average size along the third direction for each of the 1-1 extension portion of the first side margin portion contacting the first surface, the 1-2 extension portion of the first side margin portion contacting the second surface, the 1-1 extension portion of the second side margin portion contacting the first surface, and the 1-2 extension portion of the second side margin portion contacting the second surface is greater than 0% and less than 50% of an average size of the body along the third direction.

* * * * *